March 24, 1959
E. L. HOWARD
2,878,578
GEOPHYSICAL INSTRUMENT FOR MEASURING THE DIP
AND STRIKE OF GEOLOGICAL STRATA
Filed Oct. 16, 1957
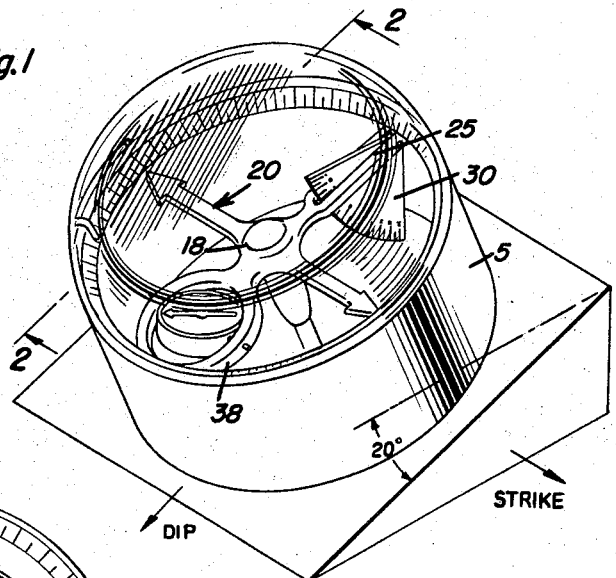
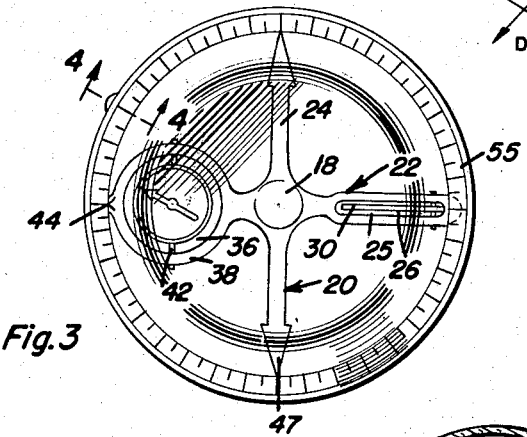
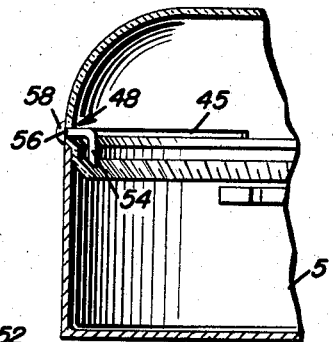
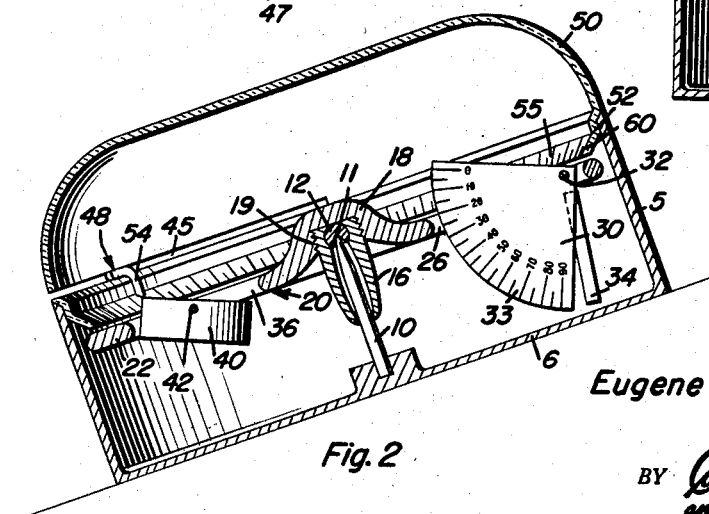
Eugene Lester Howard
INVENTOR.
BY *[signatures]*
Attorneys United States Patent Office 2,878,578
Patented Mar. 24, 1959

2,878,578

GEOPHYSICAL INSTRUMENT FOR MEASURING THE DIP AND STRIKE OF GEOLOGICAL STRATA

Eugene Lester Howard, Durango, Colo.

Application October 16, 1957, Serial No. 690,512

9 Claims. (Cl. 33—215)

This invention relates to geophysical instrument and it has for its object to provide an instrument with which the dip and strike of geological strata may be determined with high accuracy. Such determination, as well known, includes the determination of the maximum dip angle of the stratum, its orientation with respect to a reference system and the measurement of the said maximum dip angle.

At present these measurements are made separately, and it is the main object of the invention to provide a small and transportable instrument by means of which all the necessary measurements are made simultaneously with great accuracy.

The instrument according to the invention is distinguished from so-called "dip meters," sometimes called "miner's compass," as these instruments intend to measure the deviation of a compass needle from the normal inclination which can be expected on the spot and which is caused by the presence of an irregularity in the magnetic field of the earth due to ores and other minerals influencing the configuration of said magnetic field.

Essentially the invention consists in providing the three data above mentioned by means of a main instrument including a single freely rotatable indicator member which carries two further ancillary instruments adapted to indicate the dip angle and its orientation which are so balanced on said rotating indicating member that it is moved into the position indicating the maximum dip angle. This is obtained by supporting the freely rotating indicator member on a pivot projecting from a base to be placed on the geological stratum, the dip of which has to be measured, or on a plane which is parallel to the said stratum. The ancillary instruments carried by the rotatable indicator member comprise a gravitational inclinometer and a compass mounted in such position that the compass needle permits the determination of the orientation of the maximum dip angle of the stratum. Preferably one of the two ancillary instruments carried by the rotatable member, for instance the compass, acts also as a weight moving the indicator member into the position corresponding to the maximum dip angle.

Further, according to the invention, the instrument is provided with a rotatable graduation scale, arranged essentially in a plane parallel to the base of the instrument, cooperating with the rotatable indicator member, by means of which scale the orientation of the maximum dip of the stratum may be determined; simultaneously the direction indicated by the compass needle may be transferred from the compass to the central point of the scale formed by the pivot around which the rotatable indicator member rotates; the angular distance between the point on the scale indicating the maximum dip angle and the point indicated by the needle permits to obtain the spatial orientation of the said dip angle.

The gravitational inclinometer on the rotating indicator member measures the dip angle relatively to the horizontal. Thus all necessary data for the determination of the dip and strike of geological strata are simultaneously provided.

A movable corrective pointer adapted to indicate the magnetic declination may be displaceable along the scale if the angle relatively to the true geographic north has to be determined.

As seen, the main object of the invention consists in providing a compact easily handled instrument, which may, if desired, be of the size of a pocket instrument, providing all the data for determining the maximum dip angle of a stratum and its orientation in space.

A further object of the invention consists in providing a dip angle measuring instrument with a rotatable member, which under the gravitational influence of a weight, indicates the maximum dip angle, and which carries ancillary instruments for measuring the angular position of the indicating member relatively to the vertical or horizontal.

A further object of the invention consists in weighting the rotatable indicating member by a suitable selection of the weight of the ancillary instrument carried by it, producing unbalance.

A still further object of the invention consists in arranging a compass eccentrically with respect to the center of rotation of the rotatable indicator member on the latter for weighting the said member, while providing manually rotatable means for permitting the transfer of the direction indication of the compass needle arranged eccentrically on said rotating indicator member and swinging in a horizontal plane, to a graduation centered on the center of rotation of said rotating indicating member and inclined in the direction of the dip of the stratum, thus permitting to measure the angle between the plane of the maximum dip of the stratum and the plane of reference indicated by the compass pointing to the magnetic or geographic north.

A further object of the invention consists in providing in an instrument of this type means for correcting the indication of the compass needle with respect to magnetic declination in order to obtain a reference plane coincident with the true geographical north.

Further objects of the invention are of a more specific character and will be apparent from the following detailed specification.

The invention is illustrated in the accompanying drawings showing one embodiment thereof by way of example. It will, however, be understood that the embodiment of the invention which has been illustrated has been essentially selected in order to be able to explain the principle of the invention and the best mode of applying said principle. The specification and drawing do not contain a survey of those modifications which will readily occur to an expert skilled in this art, and a departure from the example which has been illustrated in the drawing is therefore not necessarily a departure from the principle of the invention.

In the drawing:

Figure 1 is a perspective view of the instrument when placed on a plane considered to be the plane of the geological stratum the dip and strike of which has to be measured;

Figure 2 is an elevational sectional view of the instrument, the section being taken along a plane passing through line 2—2 of Figure 1;

Figure 3 is a plan view of the instrument; and

Figure 4 is a fragmentary elevational sectional view, the section being taken along line 4—4 of Figure 3.

The instrument illustrated by way of example in the drawing, is a pocket instrument which may be carried by a prospector or a geological surveyor.

The instrument comprises a cylindrical casing 5, the flat bottom 6 of which forms the base to be aligned with the stratum, the dip and strike of which has to be measured.

The base 6 carries a pivot 10 of non-magnetic material ending in a needle point 11 which serves as a support for a jewel 12 which forms the bearing of an indicator member 20 rotating freely around the pivot in a plane at right angles to the same. The indicator member 20 preferably consists of two arms described below projecting from a central hub member 18 which is supported on a sleeve 16 which carries the jewel 12 forming the bearing of the said indicating member. The sleeve 16 projects downwardly and surrounds the pivot 10. It may be provided at its end with an inwardly projecting bearing sleeve, ledge or collar surrounding the pivot closely so as to maintain said indicating member in its position at right angles with respect to the pivot 10 during free rotation of said member.

The pivot may be provided with an embossment (not shown) just above the inwardly projecting ledge or collar of the sleeve so as to prevent the indicating member from leaving its position on the pivot when the instrument is carried in the pocket for instance, the dimensions being so selected that passage of the sleeve over the embossment is just possible. The sleeve 16, carrying the jewel, is provided with screw threads 19 which engage corresponding screw threads in the hub member 18.

The freely rotating indicator member 20, supported on the pivot by means of jewel 12, is provided with two instrument arms 22 and 24 extending diametrically through the casing, said arms being preferably arranged at right angles to each other. The instrument arm 22 which indicates the dip is provided on one side of the hub with a slotted portion 25 in the slot 26 of which a weighted clinometer segment 30 may move. The clinometer segment has preferably the shape of a quadrant, made of a sheet of thin and light metal, which is pivotally suspended near the end of the slotted portion 26 of the arm on a pivot pin 32. The segment is provided with a graduation 33. A weight 34 may be attached to the quadrant disc maintaining said disc at all times in such a position that the zero line of the graduation is at the horizontal, whatever the position of the instrument.

On the other side of the hub member 18 the instrument arm 22 is provided with an enlargement forming a frame 38 surrounding a circular opening 36. Within this opening a compass 40 is suspended on pivot pins 42 which permit an adjustment of the position of the compass so that the compass is at all times maintained in a horizontal position.

In the instrument as illustrated the weight of the compass is so selected that the balance of the freely rotating member 20 is offset by the weight of the compass so that the arms 22, 24 will always be moved into a position in which the center of gravity of the compass occupies the lowest level.

The end of arm 22 may be provided with indicating or marking buttons or other marking means for a purpose stated below.

The top of the instrument is formed by a cap 50 of transparent material, for instance of a transparent resinous plastic, which is fitted into the box 5 by friction. The cap, on account of its circular shape and on account of the circular shape of the box into which it is fitted, is rotatable by hand. The portion 52 of the cap 50 fits snugly into the box and carries an inwardly projecting annular skirt member 60 on the upwardly looking side of which a 360° scale graduation 55 is provided which is used for determining the orientation of the maximum dip angle.

As seen, the inwardly projecting annular member 60 carrying the scale 55 is preferably inclined towards the base 6. If the indicator arm is not otherwise prevented from slipping out of engagement with the pivot the skirt-like projection 60 may be used in order to keep the rotating indicator member in its place as the instrument occupies varying positions. This angular skirt member 60, as seen in Figure 2, for this purpose may project into the immediate vicinity of the rotating indicator member thus limiting any movement which this member may perform.

The transparent cap is preferably provided with a vector mark either by drawing a line on the cap or by arranging a transverse member (not shown) in order to facilitate the correct orientation of the cap and of the scale carried thereby.

To determine the dip of a stratum without correction for magnetic inclination no further indicating member is necessary. But if a correction for magnetic declination is desired the cap is provided with a slot 45 of a suitable extension within which the pointer 48 is slidable. The pointer 48, as seen in Figure 4, is angularly bent having a downwardly directed pointing end 54 which is close to the scale 55 while its other arm 56 projects outwardly through the slot 45 and terminates in a knob 58 by means of which the position of the pointer may be adjusted and fixed if necessary.

When the instrument is to be used, it is necessary to place the instrument with its base on the stratum the dip of which is measured or on a plane which is parallel to the stratum. As this is a pocket instrument of very small dimensions, this in itself is easily performed, although it may not always be easy for the surveying geologist to gauge whether the position given to the instrument is indeed the correct one. In such cases in which a very small instrument is used and in which the geological stratum does not offer a flat surface, a flat board of any material of larger dimensions may be used which on account of these larger dimensions may be easily so positioned that the various irregularities of the surface of the stratum do no longer influence the position. Such a board may therefore be so positioned that its inclination corresponds exactly to that of the geological stratum to be measured. The surface of the board is then that surface on which the instrument is placed.

Once the instrument is in its position on the stratum or board all data are easily obtained.

When the instrument has been brought into its correct position the freely rotating indicator member 20 under the influence of the weight of the compass 40 carries said rotating indicator arm 24 to that point at which the lower end of this arm is at the lowest level. During this rotation, however, the compass 40 and the upper edge of the clinometer segment 30 remain in their horizontal positions.

When the above described position has been reached by member 20, the mark on indicator arm 22 indicates the position of the maximum dip of the stratum and the arm 24 at right angles thereto indicates the strike of the stratum. The upper edge with the zero line of the quadrant disc of the clinometer segment 30 is still in its horizontal position and the surface of the indicator member 20 now permits to read the dip angle on the graduation 33 of the quadrant segment. The compass also retains its horizontal position during the movement of indicating member 20.

The operating surveyor now rotates the cap 50 to bring it into a position in which the vector mark on the cap is parallel to the needle of the compass, bringing the zero mark of the 360° scale 69 into correct position with respect to the reference plane which in this case is the magnetic north. The angle between the zero point and the mark 44 at the lowest point of the indicator arm 22 indicates the orientation of the maximum dip angle of the stratum relatively to the reference plane, and the arrows 47 on arm 24 indicate the orientation of the strike. Thus all the necessary data for the determination of the dip and strike are obtained.

If the magnetic declination has to be considered, the reference plane being the true geographic north, the pointer 48 is previously moved to the value corresponding to the magnetic declination of the point at which the measurement is made; the vector passing through the pointer 48 is now brought into a position in which it is parallel with the compass needle. At the zero point of the scale the true geographic north is then automatically positioned. The angular distance between the true north and the point indicated by the mark 44 of the rotating indicator arm 22 is then the azimuth angle determining the orientation of the maximum dip angle, while the two arrows 47 on the arm 24 indicate the strike of the stratum.

It is thus seen that the instrument according to the invention, by bringing its base into a position in which it is parallel with a geological stratum provides all the data which are necessary in order to provide a surveying geologist with full information with respect to the dip angle of the stratum and its orientation in space.

It will be understood that minor changes of the instrument structure will not in any way affect the principle of the invention, and that therefore the adaptations of the instrument for different purposes by experts skilled in this art and other changes of this type cannot be considered as a departure from the essence of the invention as defined in the annexed claims.

Having described the invention, what is claimed is:

1. A geophysical instrument for measuring the dip and strike of geological strata comprising a base, a pivot pin mounted on and projecting from said base, a member carried by and freely rotatable on said pivot pin in a plane parallel to the base, ancillary instruments freely suspended on and carried by said freely rotatable member, said ancillary instruments maintaining their position relatively to the horizontal, one of said ancillary instruments being a compass, indicating a reference system in space, and another ancillary instrument being a clinometrical device indicating the angle of the freely rotating member with respect to the horizontal, and a manually rotatable graduation scale surrounding said freely rotatable member, adapted to be oriented in conformity with the indications of the compass.

2. A geophysical instrument for measuring the dip and strike of geological strata, comprising a base to be placed on a stratum to be measured, a pivot pin on said base, a freely rotating indicator member supported by and rotating on said pivot pin in a plane parallel to the base, said rotating indicator member being provided with ancillary instruments, one of them being a compass and the other being a weight operated clinometer, both ancillary instruments being freely suspended on said rotational indicator member so as to maintain their positions with respect to the horizontal, the rotating indicator member being unbalanced and weighted on one side, so as to occupy a definite position when the base of the instrument is placed on an inclined plane, and a manually rotatable graduation scale surrounding said freely rotatable indicator member adapted to be oriented in conformity with the compass indication, to indicate the position in space occupied by the freely rotatable weighted indicator member when the base is in an inclined position.

3. A geophysical instrument as claimed in claim 1, wherein the rotating indicator member includes a slotted arm carrying a weighted substantially vertical clinometer disc, suspended within the slot of the arm for free movement around a substantially horizontal axis in said arm.

4. A geophysical instrument as claimed in claim 1, wherein the rotating indicator member includes an arm provided with a circular frame and wherein the compass is suspended within said frame for free rotational movement around a substantially horizontal axis.

5. A geophysical instrument as claimed in claim 2, wherein the freely rotating indicator member includes arm sections extending in diametrically opposite directions, one arm section carrying the freely suspended weighted clinometer, while the diametrically opposite arm section carries the freely suspended compass, said clinometer and said compass being of unequal weight so as to provide an unbalance of the indicator member moving one arm section always to the lowest level position in every position of the base of the instrument.

6. A geophysical instrument for measuring the dip and strike of geological strata comprising a base to be placed on a stratum the dip of which is to be determined, an instrument box the bottom of which is formed by the said base, a pivot pin projecting from said bottom forming the base, an indicating member, supported by and freely rotatable on said pivot in a plane substantially parallel to the plane of the base, said freely rotating indicator member being provided with diametrically extending arm sections extending outwardly from the portion on the indicating member supported on the pivot pin, one of said arm sections being slotted, a weighted clinometer disc in the shape of a quadrant provided with a graduation, freely suspended in said slot for rotation around a substantially horizontal axis and maintaining a reference line on the disc in a substantially horizontal position in all inclined positions of the base, the angle between said arm section maintained in substantial parallelism to the said base and the reference line of the clinometer disc thus indicating the inclination of the base of the instrument, a frame surrounding an opening arranged in the other arm section extending in a direction diametrically oposite to the first named arm section, a compass with a needle freely suspended within said frame for rotation around a substantially horizontal axis, the weight of said compass carrying arm section exceeding the weight of the arm section carrying the clinometer disc, a graduation scale surrounding the box and the rotating indicator member, rotatable on said box, a cap fixedly connected with the graduation scale, a vector marker on said cap for aligning a vector of the graduation scale in substantial parallelism with the compass needle, the weighted arm section being moved to the lowest level upon placing the base on an inclined surface indicating the direction of the maximum dip angle, the graduation scale after alignment with the compass needle indicating thus the spatial orientation of the said maximum dip angle.

7. A geophysical instrument as claimed in claim 6, wherein the cap is provided with a slot comprising in addition a pointer displaceable in the said slot to indicate the magnetic declination relatively to a point of reference of the rotatable scale.

8. A geophysical instrument as claimed in claim 6, wherein the indicating member is supported by means of a jewel in the pivot pin, and wherein the graduation scale is placed on a member having the shape of a skirt reaching over said indicating member and into the vicinity thereof when the cap has been placed on the box, thus preventing the indicating member from leaving the pivot.

9. A geophysical instrument as claimed in claim 1, wherein the freely rotatable indicating member is provided with two arms crossing each other at right angles, one of the arms being weighted and indicating the maximum dip angle when the base of the instrument is placed on a geological stratum, and the other arm indicating the strike of the strata.

No references cited.